(12) United States Patent
Jung

(10) Patent No.: US 8,525,950 B2
(45) Date of Patent: Sep. 3, 2013

(54) LIGHT GUIDE PANEL, BACKLIGHT UNIT AND DISPLAY APPARATUS

(75) Inventor: Il-yong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 12/820,732

(22) Filed: Jun. 22, 2010

(65) Prior Publication Data

US 2011/0109843 A1    May 12, 2011

(30) Foreign Application Priority Data

Nov. 6, 2009    (KR) .................. 10-2009-0107177

(51) Int. Cl.
*G02F 1/1335*    (2006.01)
(52) U.S. Cl.
USPC .................. 349/66; 349/62; 349/63; 349/64; 349/65

(58) Field of Classification Search
USPC ........................................ 349/62–66
See application file for complete search history.

(56) References Cited

U.S. PATENT DOCUMENTS

| 6,412,968 B1 * | 7/2002 | Ohkawa ................. 362/26 |
| 2006/0133113 A1 * | 6/2006 | Koike et al. ............ 362/626 |
| 2008/0129927 A1 * | 6/2008 | Hamada et al. .......... 349/65 |
| 2009/0296026 A1 * | 12/2009 | Bae et al. .............. 349/65 |

FOREIGN PATENT DOCUMENTS

| JP | 2006-134750 A | 5/2006 |
| KR | 10-2008-0004133 A | 1/2008 |

\* cited by examiner

*Primary Examiner* — Phu Vu
(74) *Attorney, Agent, or Firm* — Sughrue Mion, PLLC

(57) ABSTRACT

A light guide panel, a backlight unit and a display apparatus are provided. A display apparatus includes a light guide panel including a first surface having a first pattern that increases luminance of backlight emitted from a light emitting unit, and a second surface having a second pattern that increases uniformity of luminance of the backlight emitted from the light emitting unit.

26 Claims, 5 Drawing Sheets

LIGHT GUIDE PANEL, BACKLIGHT UNIT AND DISPLAY APPARATUS

CROSS-REFERENCE TO RELATED APPLICATIONS

This application claims priority from Korean Patent Application No. 10-2009-0107177, filed on Nov. 6, 2009 in the Korean Intellectual Property Office, the disclosure of which is incorporated herein by reference in its entirety.

BACKGROUND

1. Field

Apparatuses and methods consistent with exemplary embodiments relate to a light guide panel, a backlight unit and a display apparatus, and more particularly, a light guide panel capable of displaying an image using a light emitting module in a display as backlight, a backlight unit and a display apparatus.

2. Description of the Related Art

Liquid crystal displays (LCDs) generally cannot emit light by themselves. Accordingly, an LCD requires a backlight unit (BLU) to emit backlight onto an LCD panel.

The BLU includes a light emitting unit which generates backlight, and a light guide panel which transmits the backlight onto the surface of the display panel uniformly. The light emitting unit includes light emitting elements which are arranged to efficiently project the backlight onto the LCD, and driving elements which drive the light emitting elements. The driving elements may be implemented as a number suitable to drive the light emitting elements.

BLUs are divided into a direct type and an edge type. In the direct BLU, light emitting elements are positioned evenly on a rear surface of the BLU. In the edge BLU, light emitting elements are positioned only at one or more lateral side edges of the BLU.

The edge BLU has lower luminance and lower uniformity of luminance than the direct BLU, but has the advantage of being slimmer.

In the edge BLU, the light emitting elements are positioned only at the lateral side edge of the BLU, so a light guide panel is required to transmit backlight toward the center of the display panel. However, a fixing groove and a fixing protrusion of the light guide panel are disposed on a light path between the light source and the light guide panel, so a portion of light emitted onto the light guide panel may be blocked or scattered. As a result, uniformity of luminance may be lowered around the fixing protrusion, and lines or shadows may appear on the display.

Therefore, there is a need for a light guide panel capable of improving luminance of backlight and uniformity of luminance.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provides a light guide panel having patterns on the upper surface and the lower surface, a backlight unit, and a display apparatus.

According to an aspect of an exemplary embodiment, there is provided a display apparatus including a display panel which displays an image, and a backlight unit (BLU) which provides light to the display panel, wherein the BLU includes a light emitting unit which emits the light, and a light guide panel which transmits the light emitted from the light emitting unit onto a surface of the display panel uniformly, and wherein the light guide panel includes a first surface having a first pattern that increases luminance of the light emitted from the light emitting unit, and a second surface having a second pattern that increases uniformity of luminance of the light emitted from the light emitting unit, and the first surface is opposite the second surface.

The second pattern on the second surface may be a laser pattern.

The laser pattern on the second surface may include a plurality of dots.

The plurality of the dots of the laser pattern on the second surface may be arranged in a plurality of parallel lines.

The second pattern on the second surface may be a printed pattern.

The first pattern on the first surface may be a prismatic pattern.

The prismatic pattern on the first surface may have a plurality of V-shaped grooves.

The backlight unit may further include a plurality of light guide panels and a plurality of light emitting units interposed between lateral sides of the light guide panels The light emitting unit may be disposed on a lateral side of the light guide panel.

According to an aspect of another exemplary embodiment, there is provided a backlight unit (BLU) including a light emitting unit which emits light, and a light guide panel which transmits uniformly the light emitted from the light emitting unit, wherein the light guide panel includes a first surface having a first pattern that increases luminance of the light emitted from the light emitting unit, and a second surface having a second pattern that increases uniformity of luminance of the light emitted from the light emitting unit.

The second pattern on the second surface may be a laser pattern.

The first pattern on the first surface may be a prismatic pattern.

The prismatic pattern on the first surface may have a plurality of V-shaped grooves.

The second pattern on the second surface may include a plurality of dots.

According to an aspect of another exemplary embodiment, there is provided a light guide panel including a first surface having a first pattern that increases luminance of light emitted from a light emitting unit, and a second surface having a second pattern that increases uniformity of luminance of the light emitted from the light emitting unit, wherein the first surface is opposite the second surface.

The second pattern on the second surface may be a laser pattern.

The first pattern on the first surface may be a prismatic pattern.

The prismatic pattern on the first surface may have a plurality of V-shaped grooves.

The second pattern on the second surface may include a plurality of dots.

According to an aspect of another exemplary embodiment, there is provided a display apparatus including a display panel which displays an image; and a backlight unit (BLU) which provides light to the display panel, wherein the BLU includes a light emitting unit which emits the light; and a light guide panel which transmits the light emitted from the light emitting unit onto a surface of the display panel uniformly, wherein the light guide panel includes a first surface having a pattern that directs the light from the first surface toward the display panel, and a second surface having a pattern that scatters the light to an increasing degree as a distance from the light emitting unit increases.

The pattern of the first surface may be a prismatic pattern.

The prismatic pattern of the first surface may include a plurality of V-shaped grooves.

The pattern of the second surface may include a plurality of indentations that are more compact as a distance from the light emitting unit increases and less compact as a distance from the light emitting unit decreases.

The indentations may be arranged in a plurality of lines that are parallel to the light emitting unit.

A spacing between adjacent lines may decrease as a distance from the light emitting unit increases.

The pattern of the second surface may includes a printed pattern.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
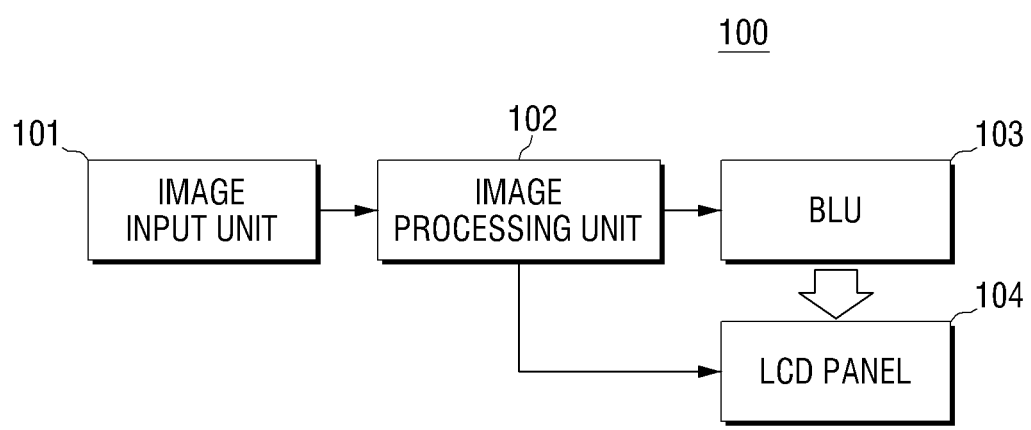
FIG. 1 is a block diagram of an LCD apparatus according to an exemplary embodiment.

Certain exemplary embodiments will now be described in greater detail with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, the inventive concept can be practiced without those specifically defined matters. Also, well-known functions or constructions are not described in detail since they would obscure the exemplary embodiments with unnecessary detail.

Figure 2:
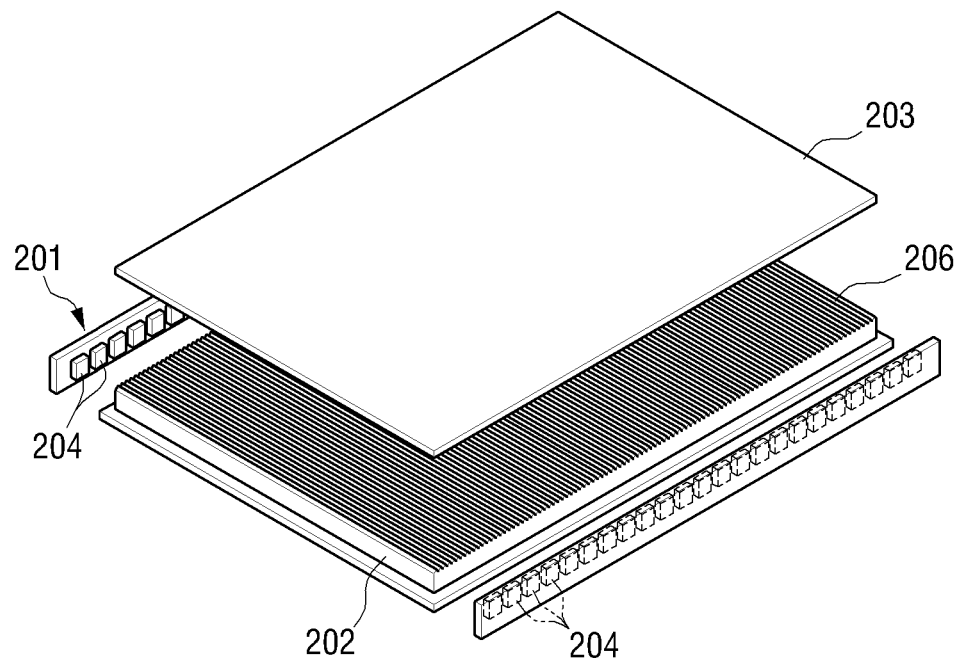
FIG. 2 is a schematic perspective view of an edge-type BLU according to an exemplary embodiment.

FIG. 1 is a block diagram of an LCD apparatus according to an exemplary embodiment. FIG. 2 is a schematic perspective view of an edge-type BLU according to an exemplary embodiment.

As illustrated in FIG. 1, the LCD apparatus 100 may include an image input unit 101, an image processing unit 102, a BLU 103, and an LCD panel 104.

The image input unit 101 includes an interface which receives an image input via a cable or wireless communication signal. The image input unit 101 transmits the input image to the image processing unit 102.

The image processing unit 102 converts the input image into an image signal suitable to be processed by the LCD panel 104, and generates a brightness control signal for local dimming of the BLU 103. In addition, the image processing unit 102 processes a signal to operate a light emitting unit 201 (FIG. 2) of the BLU 103 and transmits the processed signal to the BLU 103.

As illustrated in FIG. 2, the BLU may include the light emitting unit 201, a light guide panel 202, and a diffusion plate 203.

The BLU 103 receives signals generated by the image processing unit 102 and drives the light emitting unit 201 to emit backlight onto the LCD panel 104. This is necessary because the LCD panel 104 cannot emit light by itself. The light emitting unit 201 may include a plurality of light emitting elements 204 which emit backlight, and a driving element (not shown) which drives the light emitting elements 204. The light guide panel 202 transmits the backlight emitted from the light emitting unit 201 onto the surface of the LCD panel 104 uniformly. The light emitting unit 201 is described in greater detail with reference to FIGS. 2, 3, and 4.

The LCD panel 104 visualizes and displays the image signal by adjusting transmittance of the backlight generated by the BLU 103. The LCD panel 104 is formed by facing two substrates including electrodes toward each other and injecting a liquid crystal substance between the two substrates. If a voltage is applied to the two electrodes, an electric field is generated and molecules of the liquid crystal substance injected between the two substrates move, so transmittance of the backlight can be adjusted.

A configuration of the BLU according to the exemplary embodiment is described in greater detail with reference to FIG. 2.

The light emitting unit 201 is driven by a driving element, and emits backlight. The emitted backlight illuminates two sides of the light guide panel 202.

As described above, the light guide panel 202 transmits the backlight emitted from the light emitting unit 201 onto the surface of the LCD panel 104 uniformly. However, efficiency of the backlight may be reduced while the backlight passes through the light guide panel 202. In order to solve this problem, a prismatic pattern 206 may be formed on the upper surface of the light guide panel 202. The prismatic pattern 206 is a pattern including a plurality of V-shaped grooves extending parallel to one another as illustrated in FIG. 2. The prismatic pattern on the upper surface of the light guide panel 202 converts the side light emitted from the light emitting unit 201 into front light and concentrates the radiating light to increase luminance. Accordingly, the prismatic pattern 206 on the upper surface of the light guide panel 202 can provide backlight of high luminance. In addition, the light guide panel 202 having the prismatic pattern 206 on the upper surface does not need a separate prism sheet, thereby reducing the manufacturing costs.

The prismatic pattern 206 may be formed using an extrusion method in which the light guide panel 202 having the prismatic pattern 206 on the upper surface is manufactured by passing materials of the light guide panel 202 through an extrusion device including at least one roller having a plurality of V-shaped grooves.

A pattern may be formed on the lower surface of the light guide panel 202 so as to enhance uniformity of luminance of the backlight. This pattern may be formed using laser and may include a plurality of indentations that are more compact as a distance from the light emitting unit 201 increases. The laser pattern may be a dotted pattern, i.e., a plurality of dots, or a dotted line pattern, i.e., a plurality of dots arranged in a plurality of parallel lines that are parallel to the light emitting unit 201. The laser pattern is described in greater detail with reference to FIGS. 3A to 3D.

The diffusion plate 203 diffuses the backlight, which was emitted from the light emitting unit 201 and passed through the light guide panel 202, along the surface of the diffusion plate 203, so color and brightness of the entire LCD panel 104 can be seen uniformly.

Figure 3A:
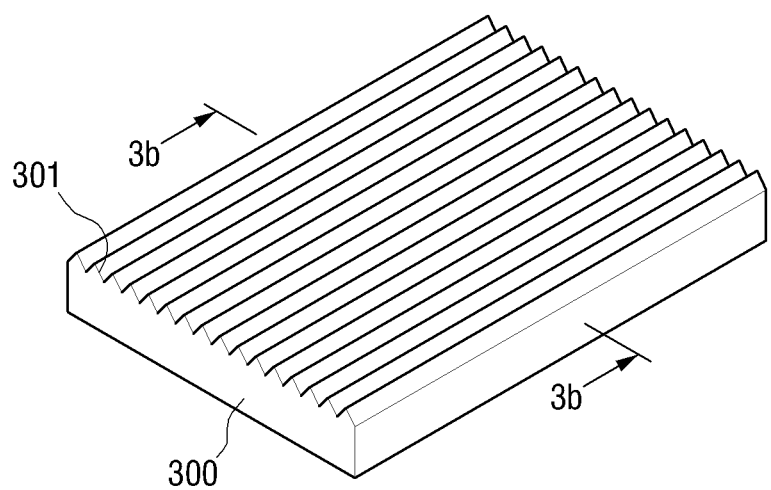
FIG. 3A is a perspective view of a light guide panel according to an exemplary embodiment.

Hereinafter, a configuration of a light guide panel according to the exemplary embodiment is described in greater detail with reference to FIGS. 3A to 3D. FIG. 3A is a perspective view of the light guide panel 300 according to an exemplary embodiment.

As illustrated in FIG. 3A, a prismatic pattern 301 is formed on the upper surface of the light guide panel 300.

As described above, the prismatic pattern 301 is a pattern including a plurality of V-shaped grooves as illustrated in FIG. 3A. The prismatic pattern 301 on the upper surface of the light guide panel 300 converts the side light emitted from the light emitting unit 201 into front light and concentrates the radiating light to increase luminance. Accordingly, the prismatic pattern 301 can provide backlight of high luminance. In addition, the light guide panel 300 having the prismatic pattern on the upper surface does not need a separate prism sheet, thereby reducing the manufacturing costs.

The light guide panel 300 having the prismatic pattern may be formed using an extrusion method in which the light guide panel 300 having the prismatic pattern 301 on the upper surface is manufactured by passing materials of the light guide panel through an extrusion device including at least one roller having a plurality of V-shaped grooves.

Figure 3B:
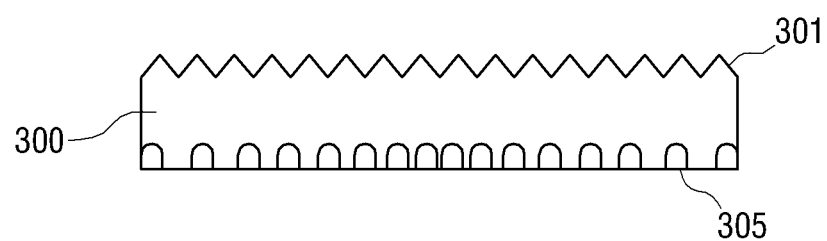
FIG. 3B is a cross-sectional view of a light guide panel according to an exemplary embodiment.

FIG. 3B is a cross-sectional view of the light guide panel which is cut along line 3*b* as illustrated in FIG. 3A.

As illustrated in FIG. 3B, the prismatic pattern 301 is formed on the upper surface of the light guide panel 300 and a pattern 305 is formed on the lower surface of the light guide panel 300, wherein the lower surface is in parallel to an opposed to the upper surface.

The prismatic pattern 301 has a plurality of V-shaped grooves as illustrated in FIG. 3B. The prismatic pattern 301 converts the backlight emitted from the light emitting unit into front light without a separate prism sheet and concentrates the radiating light to increase luminance. Accordingly, the prismatic pattern 301 on the upper surface of the light guide panel 300 can provide backlight of high luminance and reduce the manufacturing costs since a separate prism sheet is not needed.

The pattern 305 is formed on the lower surface of the light guide panel 300 so as to enhance uniformity of luminance of the backlight. More specifically, as illustrated in FIG. 3B, intervals of the grooves in the pattern 305 get looser, or more spaced apart, towards the sides of the light guide panel which are close to the light emitting unit, and get denser, or closer to one another, towards the center of the light guide panel which is far from the light emitting unit. That is, the spacing between adjacent grooves, or lines of indentations, decreases as a distance from the light emitting unit increases. If intervals of the grooves at the center of the light guide panel 300 are denser than intervals of the grooves at the sides of the light guide panel 300, the backlight is more scattered and reflected at the center than at the sides. As a result, the pattern 305 can transmit the backlight evenly to the center of the display far from the light emitting unit as well as to the edges of the display close to the light emitting unit. Therefore, uniformity of luminance of the backlight can be improved.

The pattern 305 may be formed on the lower surface of the light guide panel 300 using a laser. By using a laser, the pattern 305 can be formed precisely, and reproducibility of the pattern 305 is improved so that the quality of manufacture of the pattern 305 can be secured regularly. In particular, the laser pattern 305 is suitable for manufacturing large light guide panels.

Alternatively, the pattern 305 may be formed on the lower surface of the light guide panel 300 using printing. That is, the pattern 305 may be printed on the lower surface of the light guide panel 300 using an ink that causes irregular reflection. This method is suitable for mass production. The light may be increased or decreased by adjusting the mixture ratio of inks.

Figure 3C:
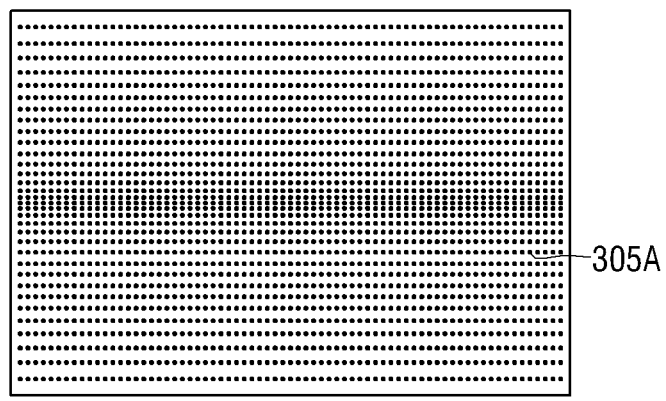
FIG. 3C is a rear view of a light guide panel having a dotted pattern on the lower surface according to an exemplary embodiment.

Hereinafter, shapes of a pattern on the lower surface of the light guide panel 300 are described in greater detail with reference to FIGS. 3C to 3D. FIG. 3C is a rear view of a light guide panel 300 having a dotted pattern 305A on the lower surface according to an exemplary embodiment.

As illustrated in FIG. 3C, intervals of the dotted pattern 305A get denser, or smaller, towards the center of the light guide panel 300, and get less dense, or larger, towards the sides of the light guide panel 300. In this case, a light emitting unit (not shown) may be disposed at the upper and lower sides of the light guide panel 300. If intervals of the dotted pattern 305A get denser towards the center of the light guide panel than towards the sides of the light guide panel 300, scattering and reflection of backlight occurs at the center of the light guide panel 300 more than at the sides of the light guide panel 300. As a result, the pattern on the lower surface of the light guide panel 300 can uniformly transmit backlight to the center of a display which is far from the light emitting unit as well as to the sides of the display which are close to the light emitting unit. Therefore, uniformity of luminance of backlight can be improved.

Figure 3D:
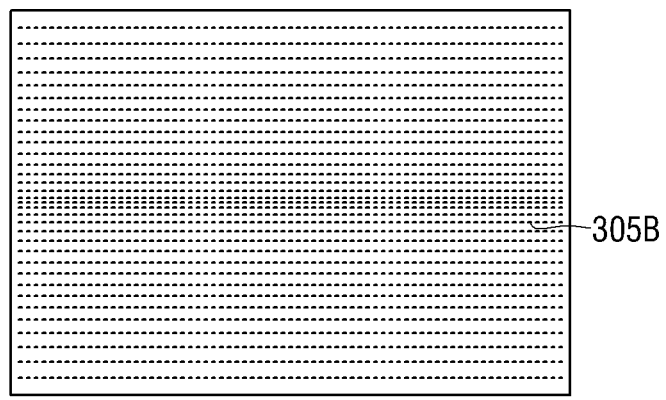
FIG. 3D is a rear view of a light guide panel having a pattern having dotted lines on the lower surface according to an exemplary embodiment.

FIG. 3D is a rear view of a light guide panel 300 having a pattern 305B having dotted lines on the lower surface according to an exemplary embodiment.

As illustrated in FIG. 3D, intervals of the dotted line pattern 305B get denser, or smaller, towards the center of a light guide panel 300, and get less dense, or larger, towards the sides of the light guide panel 300, as in the dotted pattern 305A shown in FIG. 3C. In this case, a light emitting unit (not shown) may be disposed at the upper and lower sides of the light guide panel 300. Detailed description is the same as in FIG. 3C.

Uniformity of luminance of backlight may be improved by adjusting intervals of the pattern on the lower surface of the light guide panel as illustrated in FIGS. 3C to 3D, or by adjusting the size of pattern. More specifically, the size of pattern of side portions of the light guide panel which are close to the light emitting unit is made small, and the size of pattern of center of the light guide panel which is far from the light emitting unit is made large. Accordingly, scattering and reflection can be caused on the pattern of the center portion of the light guide panel more than in the pattern of the side portion. As a result, the pattern on the lower surface of the light guide panel can uniformly transmit backlight to the center of a display which is far from the light emitting unit as well as to the sides of the display which are close to the light emitting unit. Therefore, uniformity of luminance of backlight can be improved.

Figure 4:
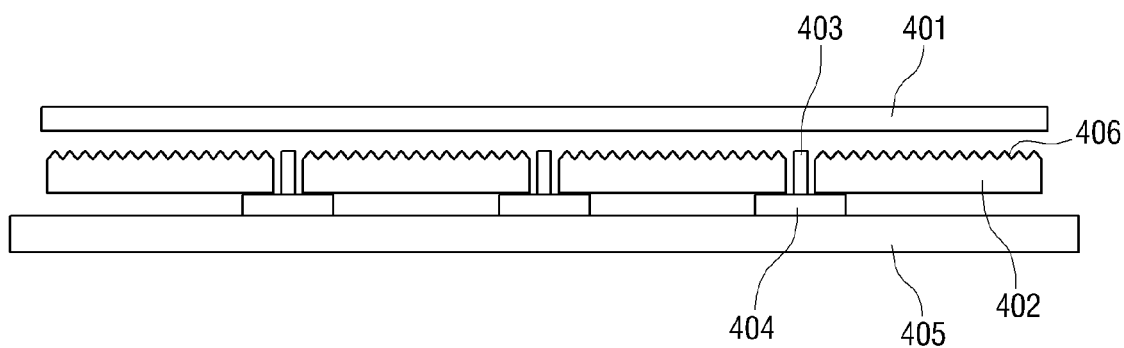
FIG. 4 is a schematic perspective view of a BLU having partitioned (or tandem type) light guide panels according to an exemplary embodiment.

Hereinafter, a BLU having partitioned (or tandem type) light guide panels is described in detail with reference to FIG. 4. FIG. 4 is a schematic perspective view of a BLU having a plurality of light guide panels that are partitioned from one another according to an exemplary embodiment.

As illustrated in FIG. 4, the BLU may include a diffusion plate 401, a light guide panel 402, a light emitting unit 403, a printed circuit board (PCB) 404, and a bottom chassis 405.

The diffusion plate 401 diffuses backlight, which was emitted from the light emitting unit 403 and passed through the light guide panel 402, along the surface of the diffusion plate 401, so color and brightness of the entire panel can be seen uniformly.

As illustrated in FIG. 4, a plurality of light guide panels 402 are provided. The plurality of light guide panels 402 transmit the backlight emitted from the light emitting unit 403 onto the surface of the LCD panel uniformly. However, efficiency of the backlight may be reduced while the backlight is passing through each light guide panel 402. In order to solve this problem, a prismatic pattern is formed on the upper surface of each light guide panel 402. The prismatic pattern 406 is a pattern including a plurality of V-shaped grooves as illustrated in FIG. 4. The prismatic pattern 406 on the upper surface of each light guide panel 402 converts the side light emitted from the light emitting unit 403 into front light and concentrates the radiating light to increase luminance. Accordingly, the prismatic pattern 406 on the upper surface of the plurality of light guide panels 402 can provide backlight of high luminance. In addition, the light guide panels 402 having the prismatic pattern 406 on the upper surface do not need separate prism sheets, thereby reducing the manufacturing costs.

The prismatic pattern 406 may be formed using an extrusion method in which the light guide panels 402 having the prismatic pattern 406 on the upper surface are manufactured by passing materials of the light guide panels 402 through an extrusion device including at least one roller having a plurality of V-shaped grooves.

A pattern is formed on the lower surface of each light guide panel 402 to enhance uniformity of luminance of the backlight. This pattern may be formed using laser. The laser pattern may be a dotted pattern or a dotted line pattern. Detailed description of the laser pattern has been given above with reference to FIGS. 3A to 3D.

As illustrated in FIG. 4, there is at least one light emitting unit 403. Each light emitting unit 403 is disposed between the light guide panels 402. The light emitting unit 403 is driven by a driving element (not shown) and emits backlight. The emitted backlight illuminates two sides of the light guide panel 402.

The PCB 404 is disposed on the bottom chassis 405, and the light emitting unit 403 is disposed on the PCB 404.

The bottom chassis 405 protects the BLU against the impact. The light guide panel 402 may be fixed directly onto the bottom chassis 405.

In the exemplary embodiments, the display apparatus is described as an LCD, but this is merely an example. The inventive concept of the exemplary embodiments is not limited to LCDs and can be applied to any display device which utilizes backlight.

In the exemplary embodiments, the prismatic pattern has a plurality of V-shaped grooves, but this is merely an example. The inventive concept of the exemplary embodiments is not limited to the prismatic pattern having a plurality of V-shaped grooves and can be applied to any patterns capable of converting the side light into the front light and concentrating the radiating light.

In the LCD display apparatus according to the exemplary embodiments, the light emitting unit is disposed on two sides of the light guide panel, but this is merely an example. The inventive concept of the exemplary embodiments is not limited to the display apparatus having the light emitting unit which is disposed on two sides of the light guide panel and can be applied to any display apparatuses having at least one light emitting unit.

In the exemplary embodiments, the lower surface of the light guide panel has a dotted pattern or a dotted line pattern, but this is merely an example. The inventive concept of the exemplary embodiments is not limited to the dotted pattern or the dotted line pattern and can be applied to any patterns capable of improving uniformity of the backlight.

In addition, the inventive concept can be applied to a BLU or a light guide panel as well as a display apparatus.

As can be appreciated from the above description, if a prismatic pattern is formed on a first surface of a light guide panel, backlight of high luminance can be provided, and if a laser pattern is formed on a second surface of the light guide panel, uniformity of luminance of backlight can be improved. Furthermore, the manufacturing costs can be reduced since there is no need for a separate prism sheet.

The foregoing exemplary embodiments are merely exemplary. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display panel which displays an image; and
   a backlight unit which provides light to the display panel, wherein the backlight unit comprises:
   a light emitting unit which emits the light; and
   a light guide panel which transmits the light emitted from the light emitting unit onto a surface of the display panel uniformly,
   wherein the light emitting unit comprises light sources disposed laterally at two side surfaces of the light guide panel,
   the light guide panel includes a first surface having a first pattern that increases luminance of the light emitted from the light emitting unit, and a second surface having a second pattern that increases uniformity of luminance of the light emitted from the light emitting unit,
   the second pattern comprises structures having dimensions which increase toward a center portion of the light guide panel and decrease toward the light sources to adjust the uniformity of luminance of the light emitted from the light emitting unit and is formed up inside the light guide panel, and
   the first surface is opposite the second surface.

2. The display apparatus according to claim 1, wherein the second pattern on the second surface is a laser pattern.

3. The display apparatus according to claim 2, wherein the laser pattern on the second surface comprises a plurality of dots.

4. The display apparatus according to claim 3, wherein the plurality of the dots of the laser pattern on the second surface are arranged in a plurality of parallel lines.

5. The display apparatus according to claim 1, wherein the second pattern on the second surface is a printed pattern.

6. The display apparatus according to claim 1, wherein the first pattern on the first surface is a prismatic pattern.

7. The display apparatus according to claim 6, wherein the prismatic pattern on the first surface comprises a plurality of V-shaped grooves.

8. The display apparatus according to claim 1, wherein the backlight unit further comprises a plurality of light guide panels and a plurality of light emitting units interposed between lateral sides of the light guide panels.

9. A backlight unit comprising:
   a light emitting unit which emits light; and a light guide panel which transmits uniformly the light emitted from the light emitting unit, wherein the light emitting unit comprises light sources disposed laterally at two side surfaces of the light guide panel, wherein the light guide panel includes:
- a first surface having a first pattern that increases luminance of the light emitted from the light emitting unit, and
- a second surface having a second pattern that increases uniformity of luminance of the light emitted from the light emitting unit,
- wherein the second pattern comprises structures having dimensions which increase toward a center portion of the light guide panel and decrease toward the light sources to adjust the uniformity of luminance of the light emitted from the light emitting unit, and
- the second pattern is formed up inside the light guide panel.

10. The backlight unit according to claim 9, wherein the second pattern on the second surface is a laser pattern.

11. The backlight unit according to claim 9, wherein the first pattern on the first surface is a prismatic pattern.

12. The backlight unit according to claim 11, wherein the prismatic pattern on the first surface comprises a plurality of V-shaped grooves.

13. The backlight unit according to claim 11, wherein the second pattern on the second surface comprises a plurality of dots.

14. A light guide panel comprising:
- a first surface having a first pattern that increases luminance of light emitted from a light emitting unit comprising light sources disposed laterally at two side surfaces of the light guide panel; and
- a second surface having a second pattern that increases uniformity of luminance of the light emitted from the light emitting unit,
- wherein the first surface is opposite the second surface,
- the second pattern comprises structures having dimensions which increase toward a center portion of the light guide panel and decrease toward the light sources to adjust the uniformity of luminance of the light emitted from the light emitting unit, and
- the second pattern is formed up inside the light guide panel.

15. The light guide panel according to claim 14, wherein the second pattern on the second surface is a laser pattern.

16. The light guide panel according to claim 14, wherein the first pattern on the first surface is a prismatic pattern.

17. The light guide panel according to claim 16, wherein the prismatic pattern on the first surface comprises a plurality of V-shaped grooves.

18. The light guide panel according to claim 14, wherein the second pattern on the second surface comprises a plurality of dots.

19. A display apparatus comprising:
- a display panel which displays an image; and
- a backlight unit which provides a light to the display panel,
- wherein the backlight unit comprises:
  - a light emitting unit which emits the light; and
  - a light guide panel which transmits the light emitted from the light emitting unit onto a surface of the display panel uniformly,
  - wherein the light emitting unit comprises light sources disposed laterally at two side surfaces of the light guide panel, and the light guide panel includes:
  - a first surface having a pattern that directs the light from the first surface toward the display panel, and
  - a second surface having a pattern that scatters the light to an increasing degree as a distance from each of the light sources increases,
  - the pattern of the second surface comprises structures having dimensions which increase toward a center portion of the light guide panel and decrease toward the light sources to adjust uniformity of luminance of the light emitted from the light emitting unit, and
  - the pattern which is comprised in the second surface is formed up inside the light guide panel.

20. The display apparatus according to claim 19, wherein the pattern of the first surface is a prismatic pattern.

21. The display apparatus according to claim 20, wherein the prismatic pattern of the first surface includes a plurality of V-shaped grooves.

22. The display apparatus according to claim 19, wherein the pattern of the second surface includes a plurality of indentations that are indented toward the first surface and are more compact as a distance from the light emitting unit increases and less compact as a distance from the light emitting unit decreases.

23. The display apparatus according to claim 22, wherein the indentations are arranged in a plurality of lines that are parallel to the light emitting unit.

24. The display apparatus according to claim 23, wherein a spacing between adjacent lines decreases as a distance from the light emitting unit increases.

25. The display apparatus according to claim 19, wherein the pattern of the second surface includes a printed pattern.

26. The display apparatus of claim 1, wherein the first pattern comprises grooves extending in a first direction, and the light sources are disposed in an array extending substantially perpendicularly to the first direction.

* * * * *